DOUBLE LOUDNESS CONTROL NETWORK
Filed May 24, 1965
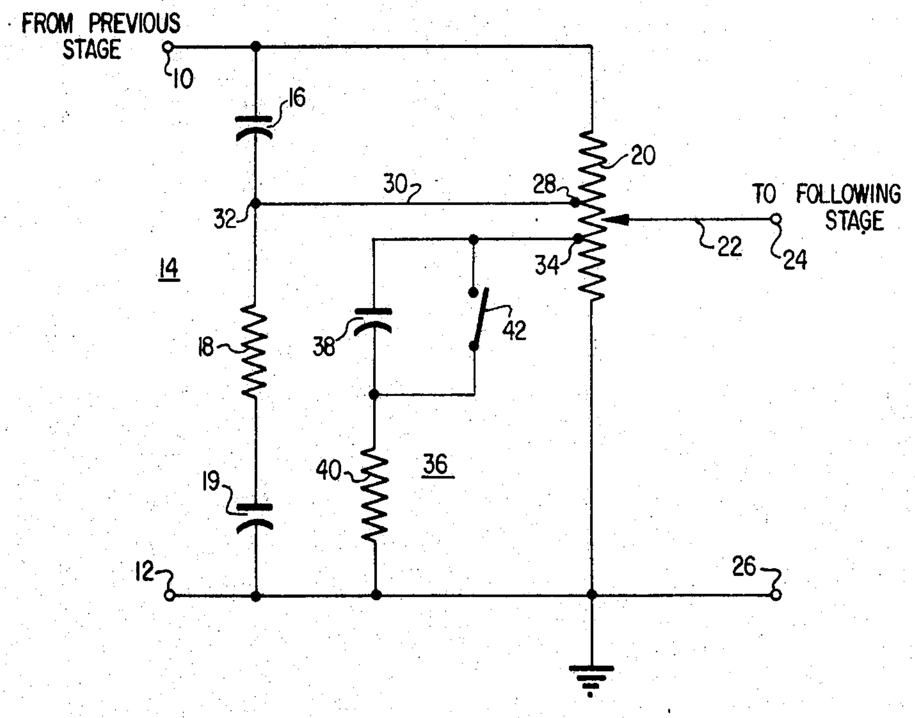
INVENTOR
J. S. GROUT
BY Thomas A. Briody
ATTORNEY United States Patent Office 3,487,341

Patented Dec. 30, 1969

3,487,341

DOUBLE LOUDNESS CONTROL NETWORK

John Stephen Grout, Decatur, Ill., assignor to General Electric Company, a corporation of New York Filed May 24, 1965, Ser. No. 458,100

Int. Cl. H03h 5/02

U.S. Cl. 333—28 3 Claims

ABSTRACT OF THE DISCLOSURE

A double-tapped volume control potentiometer has its high resistance tap connected to a normal loudness control network and its low resistance tap connected by a switch to a bass boost network that provides a relative increase in low frequencies. Such a circuit arrangement produces a double loudness control which has a switch that is manually operable to disable the bass boost network.

This invention relates broadly to a double loudness control network and more particularly to a base boost network which may be selectively inserted in, and removed from, a loudness-compensated volume control to provide an additional boost of bass tones at low levels of loudness.

The well known Fletcher-Munson curves demonstrate the response of the human ear to audio frequency signals for different loudness levels. These curves show that the ear is relatively insensitive to frequencies below 1000 cycles per second and above 5000 cycles per second. Consequently, when sound is reproduced at sound-power levels which are below its original loudness level, the high and low frequencies must be enhanced so that the reproduced sound heard by the ear matches the original sound.

Circuits are known in the prior art for enhancing the bass and high frequency tones in accordance with the Fletcher-Munson curves. However, at very low loudness levels the ear is even less responsive to bass tones than to the higher frequencies. Consequently, in higher fidelity systems, it is desirable to provide an additional optional boost of the bass tones when the loudness level of the reproduced sound is very low.

Therefore, it is a primary object of this invention to provide an improved bass boost network which may be selectively added to, and removed from, the loudness control network of a compensated volume control.

Another object is to provide a bass boost circuit which may be switched into and out of a loudness-compensated volume control without affecting the middle and high frequencies so that the overall level of the sound heard by the human ear remains unchanged for either position of the switch.

A more specific object is to provide a manually controlled network for boosting bass tones below one hundred cycles per second.

The foregoing objects are accomplished in a preferred embodiment of this invention by providing a double-tapped volume control potentiometer with a high resistance tap connected to a normal loudness network and a low resistance tap connected via a switch to a bass boost network which provides a relative increase in low frequencies. The net effect is a double loudness control with the switch being operable to disable the second loudness or bass boost network. Furthermore, in either position of the switch the middle and high audio frequencies are not affected so that the overall level of the sound, as heard by the human ear, remains unchanged.

Other objects and advantages will become apparent from the following description of the preferred embodiment of the invention which is also illustrated as a schematic circuit diagram in the attached drawing.

As shown in the drawing, the preferred embodiment comprises a pair in input terminals 10 and 12 to which may be applied audio frequency signals derived from a tuner, cartridge, tape head or the like. Across terminals 10 and 12 there is connected a loudness control network 14 comprising a high frequency boosting capacitor 16, a resistor 18 and a bass boosting capacitor 19 connected in series. Connected across loudness network 14 is a linear potentiometer resistor 20 having a movable wiper arm 22 connected to an output terminal 24. The output voltage is developed across output terminal 24 and an output terminal 26. Input terminal 12 and output terminal 26 are connected to ground. The output terminals 24 and 26 may be connected to following amplifier stages and a speaker system.

Potentiometer resistor 20 has two fixed taps. The first tap 28 is connected at the point corresponding to sixty percent of the resistance of resistor 20 as measured between the tap and ground. Tap 28 is connected via a conductor 30 to the junction 32 of capacitor 16 and resistor 18.

The second tap 34 is connected at the forty percent resistance point on potentiometer resistor 20. A bass boost circuit 36 is connected between tap 34 and ground. This circuit comprises a bass boosting capacitor 38 and a resistor 40 connected in series. A single pole, single throw switch 42 is connected across capacitor 38 such that when the switch is closed, the capacitor is short circuited.

Since the relative values of the components of the circuit just described are important to an understanding of the operation of the circuit, the following typical values are presented:

| | | |
|---|---|---|
| Capacitor **16** | micromicrofarads | 470 |
| Capacitor **19** | microfarad | .025 |
| Capacitor **38** | do | .030 |
| Resistor **18** | kilohms | 10 |
| Resistor **20** | do | 500 |
| Rseistor **40** | do | 10 |

The complete circuit shown in the drawing may be described as a loudness-compensated volume control. As wiper arm 22 is moved from the top to the bottom of resistor 20, the volume or amplitude of the audio signal appearing across terminals 24, 26 is reduced. Taps 28 and 34 and their associated circuits compensate for the response of the human ear as exemplified by the Fletcher-Munson curves.

When wiper arm 24 reaches tap 28, capacitor 16 provides a high frequency boost. The reactance of capacitor 16 is very high at bass frequencies and therefore does not affect these frequencies. However, capacitor 16 presents a very low impedance to high frequency signals thereby effectively short circuiting the portion of the resistor 20 above tap 28 with respect to these high frequencies. Consequently, the high frequency currents develop at junction 32 a voltage which is substantially unattenuated by the upper portion of resistor 20, thereby providing a high frequency boost at tap 28.

Circuit 14 also acts to boost bass frequencies. Capacitor 19 is chosen to present a very low impedance to high and middle frequencies and a very high impedance to the bass frequencies. Consequently, a portion of the high and middle frequency currents passing through the top part of potentiometer resistor 20 is shunted from wiper arm 22 to ground through resistor 18 and capacitor 19, thereby enhancing or boosting the bass tones at tap 28.

As wiper arm 22 is moved towards tap 34, the overall loudness or volume of the sound produced by the associated speaker system is further reduced. However, because of the manner in which the human ear responds to bass tones under one hundred cycles at these lower levels of sound power, the listener may begin to experience a disproportionate loss in bass tones. However, when wiper arm 22 reaches tap 34 and switch 42 is open, an effective boost of bass tones is caused by the action of bass boost circuit 36 which provides a low impedance path to ground for middle and high audio frequencies but presents a high impedance to the bass frequencies. Such a result is obtained by choosing capacitor 38 so that its reactance presents a very low impedance to high and middle audio frequencies and, consequently, very high impedance to bass frequencies below a hundred cycles. Therefore, for positions of the wiper arm betwen tap 34 and ground, the bass frequencies are given a second boost.

As can be easily determined from the values of capacitor 38 and resistor 40 presented above, the reactance of capacitor 38 forms a very small part of the total impedance presented to middle and high frequencies by bass boost circuit 36 when switch 42 is open. Because of this fact together with the relatively poor frequency response of the human ear to changes in sound power levels at low sound power levels, the listener will experience no change in overall loudness of the speaker system when the position of switch 42 is changed and wiper arm 22 is positioned between ground and tap 34. Furthermore, even though it would appear electrically that the listener would experience a reduction in loudness when switch 42 is closed because of the slightly additional attenuation of the bass frequencies, such is not the case since the ear is even less responsive to changes in the sound power level of the bass tones at these low sound power levels. Consequently, the bass tone level of the reproduced sound may be altered by means of switch 42 without any apparent change in the overall sound level heard by the listener.

In summary, there has been described above and illustrated in the drawing a preferred embodiment of an improved bass boost circuit which may be selectively switched into and out of the loudness control network of a loudness-compensated volume control without affecting the apparent overall loudness of the sound developed by the speaker system associated with the network.

While this invention has ben particularly shown and described with reference to a preferred embodiment thereof, it will be understood by those skilled in the art that various changes in form and detail may be made therein without departing the spirit and scope of the invention.

What is claimed is:

1. In a loudness-compensated volume control for an electric sound reproducing system, said control including an adjustable volume controlling potentiometer, and a first bass tone boosting network connected to said potentiometer at a first point corresponding to a volume between the maximum and minimum volumes obtainable from said control, the improvement comprising a second bass tone boosting network connected to said potentiometer at a second point corresponding to a volume lower than said first point, said second network including a series connected capacitor and resistor, and a switch connected across said capacitor for short circuiting said capacitor and therby disabling said second bass boosting network, the impedance characteristic of said second network being such that, when said control is adjusted to said second point, the overall sound loudness heard by the average human ear remains unchanged regardless of whether said second network is connected or disconnected.

2. A loudness-compensated volume control circuit for audio frequency signals comprising:

(a) a pair of input terminals for receiving signals having a wide range of audio frequencies, one of said terminals being a high potential terminal and the other being a low potential terminal,
(b) a linear potentiometer resistor connected between said input terminals,
(c) a movable tap on said resistor,
(d) a first fixed tap on said potentiometer resistor,
(e) a first resistor and a first capacitor connected in series between said first tap and said low potential input terminal, said capacitor presenting a low impedance to middle and high audio frequency signals,
(f) a second fixed tap on said potentiometer resistor and connected between said first tap and said low potential input terminal, and
(g) a bass boost circuit connected to said second tap, said bass boost circuit comprising:
 (1) a second resistor and a second capacitor connected in series between said second tap and said low potential terminal, the reactance of said second capacitance being substantially lower than the resistance of said second resistor at said middle and high frequencies, and
 (2) a switch connected across said second capacitor for short circuiting said second capacitor to disable said bass boost circuit.

3. A loudness-compensated volume control as defined in claim 1, wherein said switch means is a single-pole single-throw switch.

References Cited

UNITED STATES PATENTS

| | | |
|---|---|---|
| 1,938,256 | 12/1933 | Jacobs. |
| 3,332,041 | 7/1967 | Wilson et al. |
| 2,500,493 | 3/1950 | Holst. |
| 2,812,498 | 11/1957 | Hall. |
| 2,680,232 | 6/1954 | Clares. |
| 2,121,091 | 6/1938 | Maginess. |
| 2,695,337 | 11/1954 | Burwein. |

OTHER REFERENCES

General Elec. Service Notes for Model Radio Receiver, E155, RBS–20, 1936, FIG. 2, Circuit Schematic Diagram.

HERMAN KARL SAALBACH, Primary Examiner
C. BARAFF, Assistant Examiner

U.S. Cl. X.R.

179—1